United States Patent
Yum et al.

(10) Patent No.: US 9,525,466 B2
(45) Date of Patent: Dec. 20, 2016

(54) METHOD OF PERFORMING INTERFERENCE CANCELLATION AND APPARATUS THEREFOR

(71) Applicant: LG Electronics Inc., Seoul (KR)

(72) Inventors: Kunil Yum, Seoul (KR); Hyungtae Kim, Seoul (KR); Hyunho Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 84 days.

(21) Appl. No.: 14/670,445

(22) Filed: Mar. 27, 2015

(65) Prior Publication Data

US 2015/0296540 A1 Oct. 15, 2015

Related U.S. Application Data

(60) Provisional application No. 61/979,000, filed on Apr. 14, 2014.

(51) Int. Cl.
| | |
|---|---|
| *H04W 74/04* | (2009.01) |
| *H04B 7/02* | (2006.01) |
| *H04J 11/00* | (2006.01) |

(52) U.S. Cl.
CPC ............... *H04B 7/024* (2013.01); *H04J 11/00* (2013.01)

(58) Field of Classification Search
CPC .................................................... H04W 74/04
See application file for complete search history.

(56) References Cited

U.S. PATENT DOCUMENTS

| | | | | |
|---|---|---|---|---|
| 6,195,529 | B1* | 2/2001 | Linz | H04K 3/28 342/14 |
| 8,150,411 | B2* | 4/2012 | Fischer | H04W 28/18 370/229 |
| 2008/0133995 | A1* | 6/2008 | Lohr | H04L 1/1678 714/748 |
| 2009/0252052 | A1* | 10/2009 | Sambhwani | H04W 52/16 370/252 |
| 2009/0298524 | A1* | 12/2009 | Kuo | H04L 1/1874 455/509 |
| 2009/0325590 | A1* | 12/2009 | Liu | H04W 72/082 455/452.2 |
| 2010/0142592 | A1* | 6/2010 | Blanchard | H04B 1/1036 375/146 |

(Continued)

*Primary Examiner* — Parth Patel
(74) *Attorney, Agent, or Firm* — Morgan, Lewis & Bockius LLP

(57) ABSTRACT

A method of cancelling interference of a terminal is disclosed. The method includes receiving interference parameter configuration information including a transmission timing of interference parameter information indicating a restricted set of a plurality of interference parameters to be used by one or more interference base stations associated with the terminal and interference parameter release information including a transmission timing of an indicator indicating release of the interference parameter information, receiving the interference parameter information according to the interference parameter configuration information, performing interference cancellation using the received interference parameter information, attempting detection of the indicator according to the interference parameter release information, and performing the interference cancellation without the received interference parameter information or suspending the interference cancellation when the indicator is detected.

14 Claims, 9 Drawing Sheets

(56) References Cited

U.S. PATENT DOCUMENTS

| | | | |
|---|---|---|---|
| 2011/0075578 A1* | 3/2011 | Kim | H04L 45/124 370/252 |
| 2011/0208884 A1* | 8/2011 | Horihata | H04L 12/40143 710/105 |
| 2012/0113846 A1* | 5/2012 | Narasimha | H04W 68/02 370/252 |
| 2012/0190378 A1* | 7/2012 | Han | H04B 7/0639 455/452.2 |
| 2013/0058218 A1* | 3/2013 | Wu | H04W 74/0816 370/241 |
| 2013/0295949 A1* | 11/2013 | Seo | H04J 11/005 455/452.1 |
| 2014/0098720 A1* | 4/2014 | Zeng | H04W 72/0446 370/280 |
| 2014/0126530 A1* | 5/2014 | Siomina | H04W 52/146 370/330 |
| 2014/0133428 A1* | 5/2014 | Kazmi | H04W 24/02 370/329 |
| 2014/0206341 A1* | 7/2014 | Siomina | H04W 36/0088 455/422.1 |
| 2014/0341057 A1* | 11/2014 | Seo | H04W 24/10 370/252 |
| 2015/0016309 A1* | 1/2015 | Fang | H04L 5/14 370/277 |
| 2015/0103683 A1* | 4/2015 | Kim | H04W 24/02 370/252 |
| 2015/0133185 A1* | 5/2015 | Chen | H04W 72/1215 455/552.1 |
| 2015/0230236 A1* | 8/2015 | Zeng | H04L 41/0806 370/329 |
| 2015/0358847 A1* | 12/2015 | Takahashi | H04W 24/10 370/252 |
| 2016/0044566 A1* | 2/2016 | Nammi | H04B 1/1027 370/331 |

* cited by examiner

METHOD OF PERFORMING INTERFERENCE CANCELLATION AND APPARATUS THEREFOR

This application claims the benefit of U.S. Provisional Application No. 61/979,000, filed on Apr. 14, 2014, which is hereby incorporated by reference as if fully set forth herein.

BACKGROUND OF THE INVENTION

Field of the Invention

The present invention relates to a wireless communication system, and more particularly, to a method of performing interference cancellation and an apparatus therefor.

Discussion of the Related Art

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

SUMMARY OF THE INVENTION

Accordingly, the present invention is directed to a method of performing interference cancellation, and a signaling scheme for more efficient interference cancellation using the method.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of cancelling interference of a terminal, the method being performed by the terminal includes receiving interference parameter configuration information including a transmission timing of interference parameter information indicating a restricted set of a plurality of interference parameters to be used by one or more interference base stations associated with the terminal and interference parameter release information including a transmission timing of an indicator indicating release of the interference parameter information, receiving the interference parameter information according to the interference parameter configuration information, performing interference cancellation using the received interference parameter information, attempting detection of the indicator according to the interference parameter release information, and performing the interference cancellation without the received interference parameter information or suspending the interference cancellation when the indicator is detected, wherein the interference parameter configuration information includes a transmission timing of interference parameter information for respective one of the one or more interference base stations, and the transmission timing of interference parameter information for respective one of the one or more interference base stations are configured not to collide with each other.

Additionally or alternatively, the transmission timing of the indicator may be configured not to collide with the transmission timing of the interference parameter information for respective one of the one or more interference base stations.

Additionally or alternatively, the interference parameter release information may include transmission timing of indicators indicating release of interference parameter information for respective one of the one or more interference base stations, and the transmission timing of the indicators indicating release of interference parameter information for respective one of the one or more interference base stations may be configured not to collide with each other.

Additionally or alternatively, the indicator may be encoded with a cell identifier (ID) of a corresponding interference base station or a cell ID of a serving base station of the terminal.

Additionally or alternatively, the indicator may be associated with a scrambling ID value included in downlink control information.

Additionally or alternatively, the interference parameter information may be received from the one or more interference base stations or a serving base station of the terminal.

Additionally or alternatively, the interference parameter information may further indicate an unrestricted entire set of the plurality of interference parameters.

In another aspect of the present invention, a terminal configured to perform interference cancellation includes a radio frequency (RF) unit, and a processor configured to control the RF unit, wherein the processor is configured to receive interference parameter configuration information including a transmission timing of interference parameter information indicating a restricted set of a plurality of interference parameters to be used by one or more interference base stations associated with the terminal and interference parameter release information including a transmission timing of an indicator indicating release of the interference parameter information, receive the interference parameter information according to the interference parameter configuration information, perform interference cancellation using the received interference parameter information, attempt detection of the indicator according to the interference parameter release information, and perform the interference cancellation without the received interference parameter information or suspend the interference cancellation when the indicator is detected, wherein the interference parameter configuration information includes a transmission timing of interference parameter information for respective one of the one or more interference base stations, and the transmission timing of interference parameter information for respective one of the one or more interference base stations are configured not to collide with each other.

Additionally or alternatively, the transmission timing of the indicator is configured not to collide with the transmission timing of interference parameter information for respective one of the one or more interference base stations.

Additionally or alternatively, the interference parameter release information may include a transmission timing of indicators indicating release of interference parameter information for respective one of the one or more interference base stations, and the transmission timing of the indicators indicating release of interference parameter information for respective one of the one or more interference base stations may be configured not to collide with each other.

Additionally or alternatively, the indicator may be encoded with a cell ID of a corresponding interference base station or a cell ID of a serving base station of the terminal.

Additionally or alternatively, the indicator may be associated with a scrambling ID value included in downlink control information.

Additionally or alternatively, the interference parameter information may be received from the one or more interference base stations or a serving base station of the terminal.

Additionally or alternatively, the interference parameter information may further indicate an unrestricted entire set of the plurality of interference parameters.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
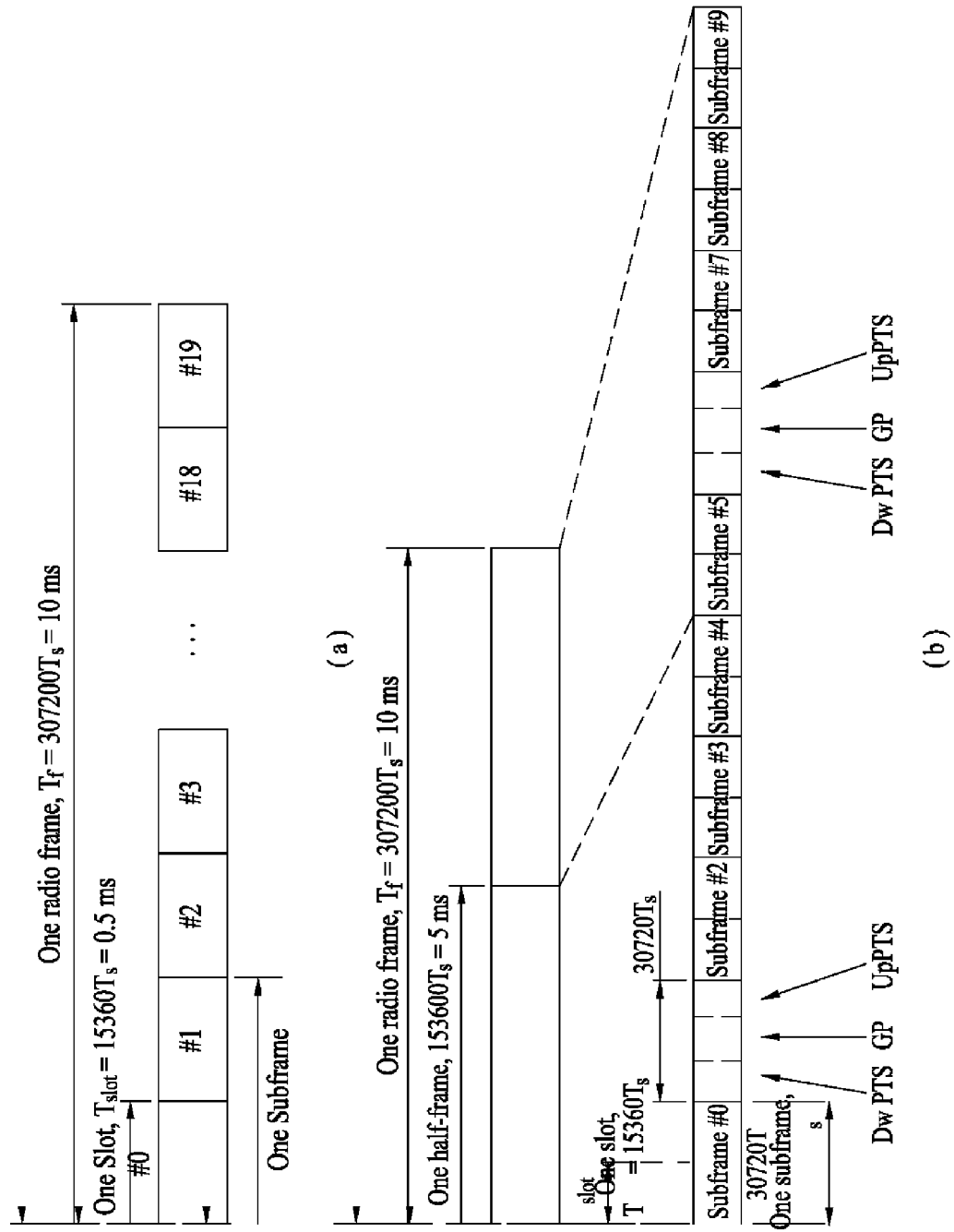
FIG. 1 is a diagram illustrating an example of a configuration of a radio frame used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming) DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals)

transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowlegement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as $T_s=1/(2048*15 \text{ kHz})$. Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
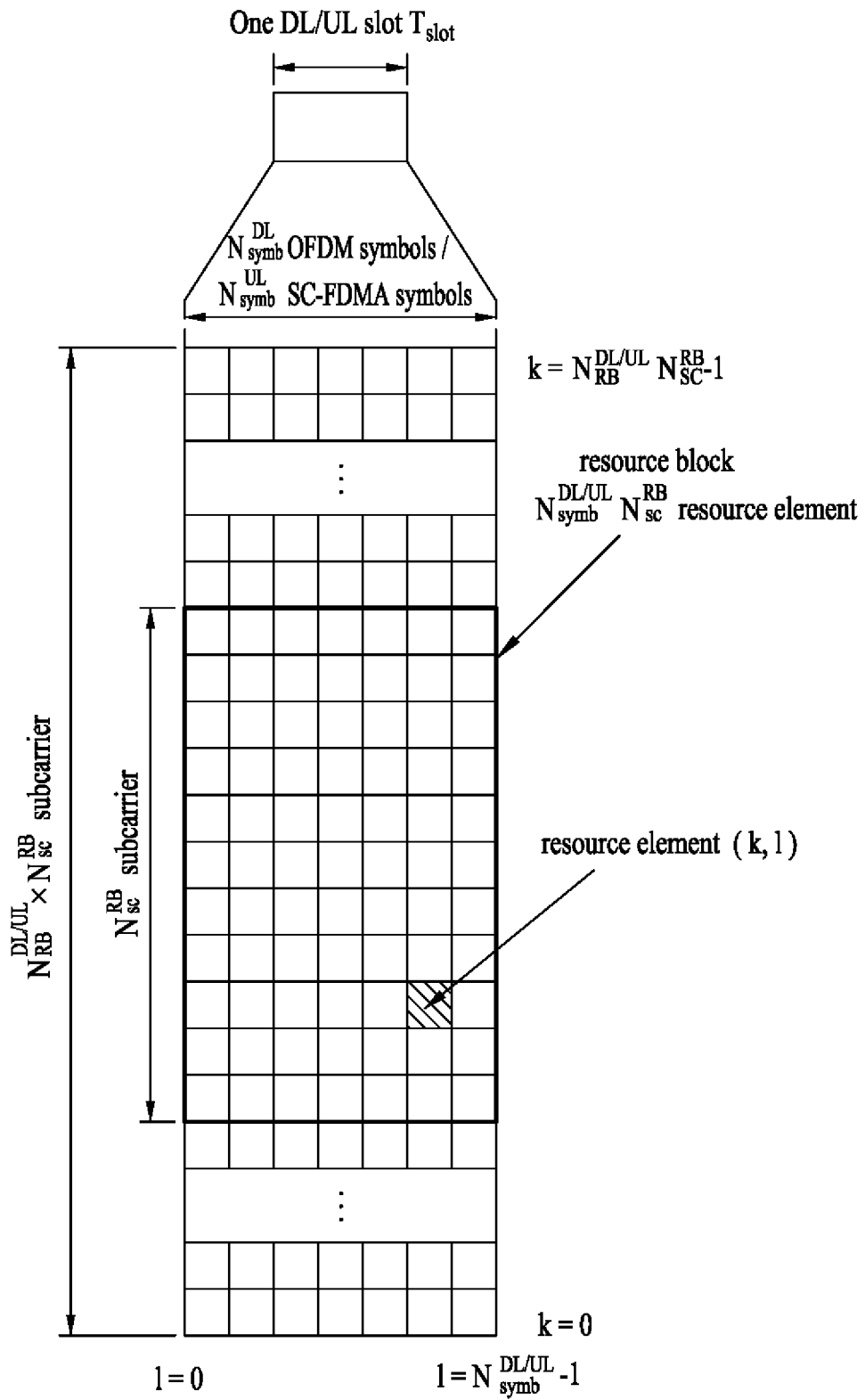
FIG. 2 is a diagram illustrating an example of a configuration of a downlink/uplink slot in the wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, $n_{PRB}=n_{VRB}$ is obtained. Numbers are given to the localized VRBs from 0 to $N_{VRB}^{DL}-1$, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
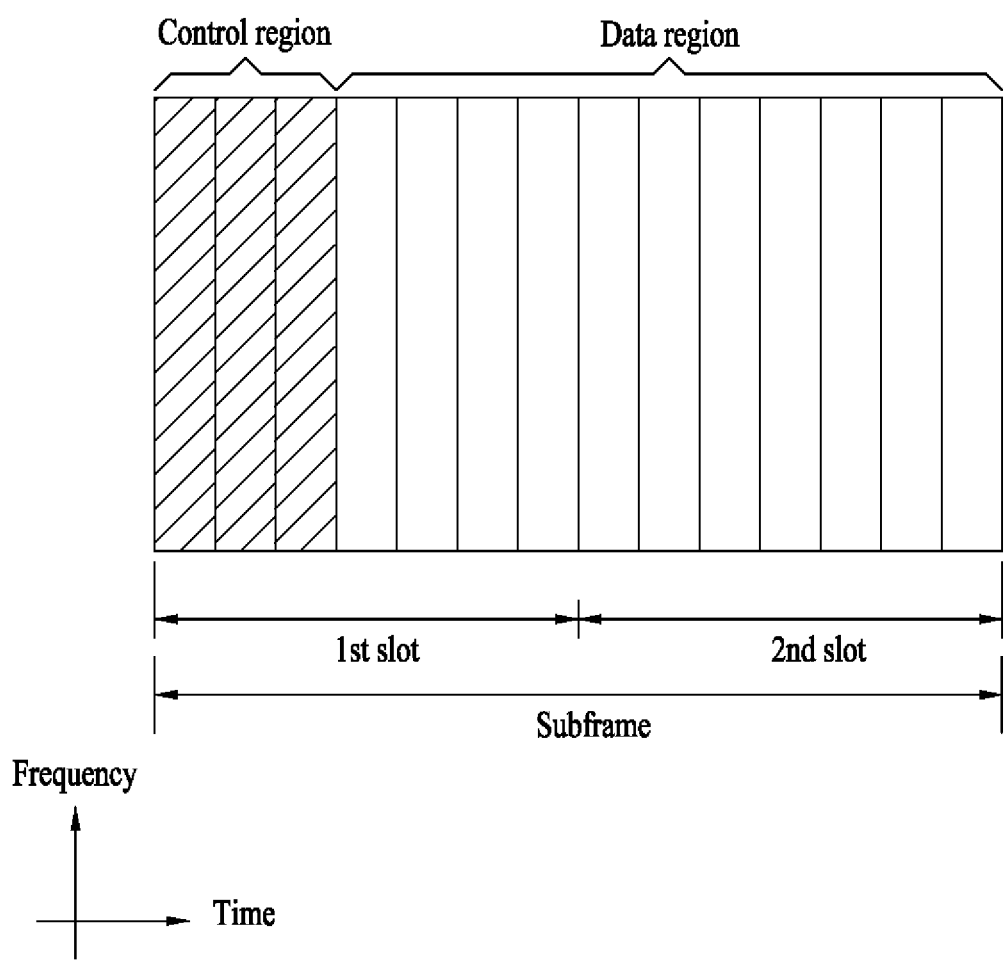
FIG. 3 is a diagram illustrating an example of a configuration of a downlink subframe used in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Search Space | | | Number of PDCCH candidates $M^{(L)}$ |
|---|---|---|---|
| Type | Aggregation Level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g. frequency position) of "B" and transmission format information (e.g. transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
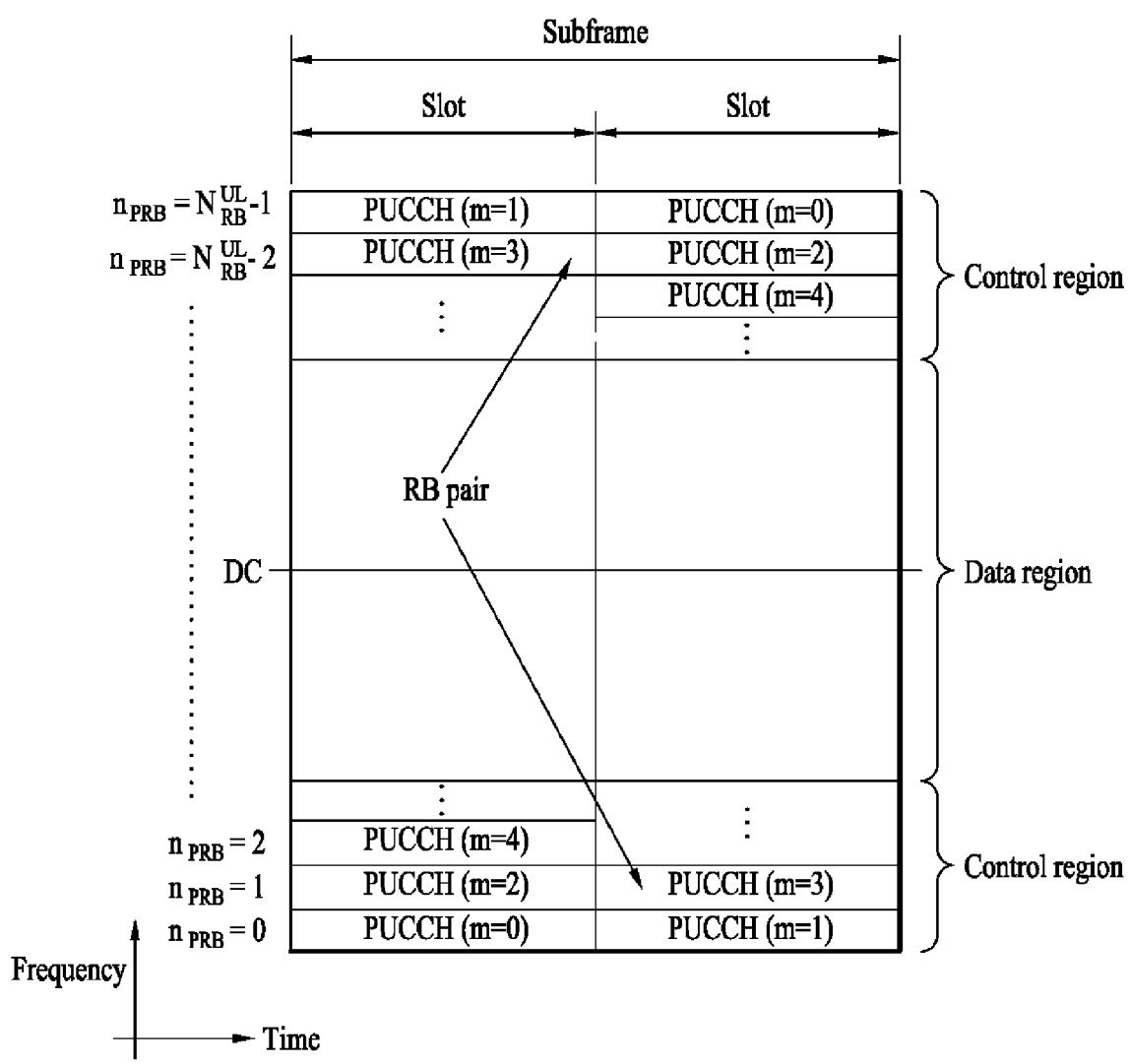
FIG. 4 is a diagram illustrating an example of a configuration of an uplink subframe used in the 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (HACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

A network-based interference cancellation scheme or a network assisted interference cancellation and suppression (NAICS) scheme that removes interference data transmitted from a neighbor cell or a transmission point with assistance from a network is being discussed in an advanced wireless communication system such as LTE Rel-12 or the like.

Figure 5:
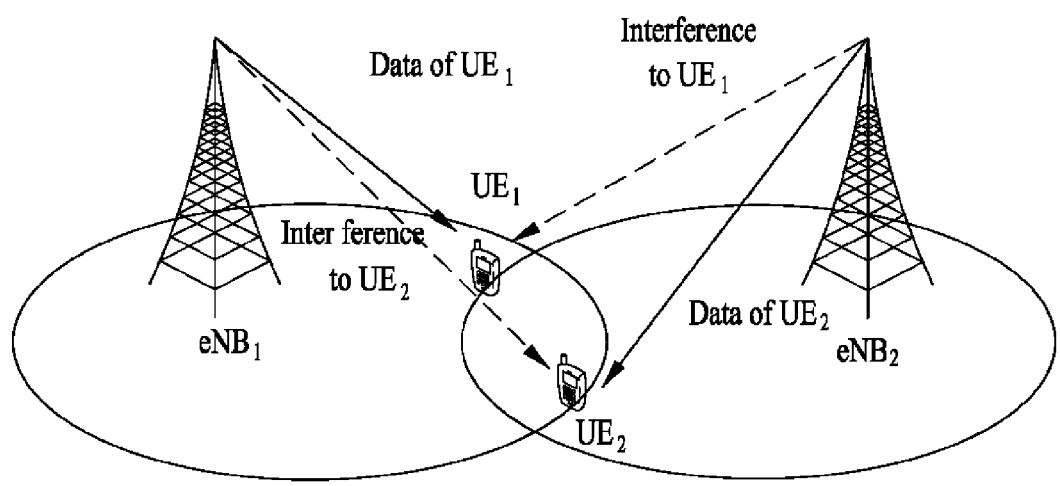
FIG. 5 is a diagram illustrating an example of interference between cells or base stations in the wireless communication system to which an embodiment of the present invention is applied.

FIG. 5 illustrates an interference environment in which data transmitted from $eNB_1$ to $UE_1$ affects $UE_2$ by interfering with $UE_2$ and data transmitted from $eNB_2$ to $UE_2$ affects $UE_1$ by interfering with $UE_1$ at the same time when $UE_1$ that receives a service from $eNB_1$ and $UE_2$ that receives a service from $eNB_1$ are present in an LTE system. In other words, in FIG. 5, $eNB_1$ is a serving cell and $eNB_2$ is an interference cell for $UE_1$. When $UE_1$ or $UE_2$ performs the NAICS scheme in FIG. 5, interference may be relieved if interference data is successfully removed from a received signal after attempting to demodulate or decode neighbor cell data. A UE that performs the NAICS scheme or has the ability to perform the NAICS scheme as in this case is referred to as an "NAICS UE," and a base station that transmits an interference signal affecting the NAICS UE is referred to as an "interference base station".

Interference-related information that may assist in NAICS by being provided to a UE from a network is present to perform the NAICS scheme. Examples of the interference-related information include a transmission mode (TM), a modulation order, a rank indicator (RI), a transmitted precoding matrix indicator (TPMI), scheduling information and the like of the interference cell. The interference-related information is referred to as an "interference parameter" in this specification, and is transmitted to a UE performing NAICS in various schemes and used to perform NAICS. The interference-related information may be delivered to the UE using a semi-static signal or a dynamic signal. In addition, a serving cell may deliver the interference-related information, and the interference base station may directly deliver control information of the interference signal.

When a backhaul between base stations is ideal, the interference parameter may be shared between cells with a significantly small delay and delivered to the UE attempting to perform NAICS. However, a non-ideal backhaul entails a delay of a minimum of several ms for delivery of the interference parameter between base stations and thus it is difficult to share the interference parameter (for example, a TPMI, a modulation order, scheduling information or the like) that indicates a dynamic characteristic of a channel through the backhaul between the base stations. In this case, a scheme of sharing a semi-static parameter between base stations and transmitting a dynamic parameter by the interference base station using an assisting PDCCH or the like such that UEs use the information is considered. However, a problem of excessive consumption of radio resources is raised. In addition, a scheme of identifying a part or all of interference parameters by the NAICS UE using blind detection is considered. However, a success/failure rate of blind detection greatly varies according to a radio condition, which directly affects the performance of NAICS. In this regard, a cooperation scheme between base stations for enhancing the performance of blind detection by restricting a part or all of the interference parameters is considered.

In other words, the above-mentioned cooperation scheme is a scheme for reducing candidates for an interference parameter to be detected using blind detection by the NAICS UE by restricting available interference parameters when an interference base station schedules a serving UE of the interference base station.

Examples of an interference parameter currently considered to be cooperated include a TM, a CRS port number, a resource allocation (RA) type, a control format indicator (CFI), a rank, a PMI, a modulation order, a Pa, a virtual cell ID and the like. Hereinafter, cooperation in or restriction on the interference parameters will be examined in detail.

Transmission Mode

A transmission mode of an interference base station refers to a transmission scheme of the interference base station. For example, TM4 is a TM that supports closed-loop MIMO, and corresponds to CRS-based transmission. In addition, TM9 refers to a TM that supports multi-layer beamforming, and corresponds to DM-RS-based transmission. In TM9, an NAICS UE may verify whether the interference base station transmits data or identify a precoding matrix used in an interference cell using a DM-RS, which may not be performed in TM4. Hence, in TM4, the NAICS UE needs to detect the precoding matrix using blind detection or receive the precoding matrix through signaling. As described in the foregoing, when a TM used in the interference base station is cooperated, less control of a particular operation with regard to NAICS is needed.

A table below shows an example of cooperation in (or restriction on) a TM.

TABLE 5

| Index | Restriction |
|---|---|
| 1 | no restriction |
| 2 | CRS-based TM only |
| 3 | DM-RS based TM only |

CRS Port Number

A CRS port number that may be identified from a PBCH of an interference base station determines a set of a maximum rank of the interference base station and a used PMI. Several dynamic parameters (a rank, a PMI and the like) may be controlled by restricting the CRS port number and thus the CRS port number is considered as an object to be cooperated.

A table below shows an example of cooperation in (or restriction on) the CRS port number.

TABLE 6

| Index | Restriction |
|---|---|
| 1 | no restriction |
| 2 | 2 CRS port |

RA Type

There are three RA types of type 0, 1 and 2. A most significant element in an RA type is a used RA granularity, which corresponds to an RB group (RBG), an RB and an RB in type 0, 1 and 2, respectively. An NAICS UE uses RA granularity as a unit when attempting to perform blind detection to identify an interference parameter. Thus, data used for blind detection increases as the RA granularity increases, which is directly associated with a success rate of blind detection and NAICS performance. Therefore, it is possible to perform cooperation such that the interference base station uses the RA type using the RBG (that is, RA type 0).

In addition, in a case such as a distributed virtual resource block (DVRB) of RA type 2, a direction and a location of a frequency of a used resource varies for each slot according to a given gap value. In this case, particular interference information (for example, information about whether interference is present) may be different between two slots in one RB and thus data of the one RB may not be used without change during blind detection. In this regard, cooperation in restricting the gap value or use of the DVRB of RA type 2 is considered.

A table below shows an example of cooperation in (or restriction on) RA types.

TABLE 7

| Index | Restriction |
|---|---|
| 1 | no restriction |
| 2 | no type 2 RA |

CFI

The CFI indicates a size of a PDCCH. In addition, the CFI is a parameter expressed by the number of OFDM symbols for transmission of the PDCCH. The CFI has a value indicated by an upper layer, or one of values of 1 to 3 or values of 2 to 4 according to a size of a system bandwidth. When the NAICS UE mistakes the CFI for another, PDSCH NAICS is performed in the PDCCH region, which adversely affects NAICS performance. Hence, fixing of a CFI value or cooperation between the interference base station and the serving base station in using the same CFI is under consideration.

A table below shows an example of cooperation in (or restriction on) the CFI.

TABLE 8

| Index | Restriction |
|---|---|
| 1 | no restriction |
| 2 | same as serving cell |

Rank

The maximum number of layers transmitted by the interference base station may be adjusted by restricting a maximum rank of the interference base station. The rank is a parameter associated with NAICS performance of the NAICS UE. The maximum number of removable layers is fixed, and it is preferable that the NAICS UE transmit only layers, the number of which is less than or equal to the maximum number of layers removable by the NAICS UE in the interference base station, so as to make the most use of NAICS performance of the NAICS UE.

In addition, there is a problem of a level of difficulty in blind detection of the NAICS UE. When the interference base station transmits two or more layers, transport streams of the interference base station have similar signal magnitudes. Therefore, it is difficult for the NAICS UE to perform blind detection of an interference characteristic between the streams. Hence, restriction of the maximum rank of the interference base station is considered so that the NAICS UE smoothly performs blind detection.

A table below shows an example of cooperation in (or restriction on) the rank.

TABLE 9

| Index | Restriction |
| --- | --- |
| 1 | no restriction |
| 2 | maximum rank 1 |

PMI

The PMI is a parameter that indicates a transmission precoding vector (or matrix) of the interference base station. When the interference base station uses a DM-RS-based TM, the precoding vector (or matrix) may be identified using a DM-RS and thus additional cooperation between base stations is not needed. However, in a CRS-based TM, an RS for identifying the precoding vector (or matrix) is absent and thus the precoding vector (or matrix) is directly identified from a data signal. Hence, a level of difficulty in blind detection for the precoding vector greatly varies depending on the number of transmission antenna ports. For example, in 4 port-CRS-based transmission for rank 1, a total of 16 types of precoding vectors is present and thus a maximum of 16 candidates for blind detection is present. It is difficult to identify a precoding vector (or matrix) used in the interference base station from the precoding vectors. On the other hand, when transmission is restricted to 2 port-CRS-based transmission, a total of 4 types of precoding vectors (or matrices) is present and thus a maximum of 4 candidates for blind detection is present, facilitating blind detection. Hence, in this case, blind detection gain due to restriction of the PMI is insignificant. In this regard, when the number of CRS ports is 4 in the CRS-based TM, restricting of the precoding vector (or matrix) used in the interference base station to a particular predetermined subset (for example, a codebook subset used for restricting a precoding subset) is under consideration.

A table below shows an example of cooperation in (or restriction on) the PMI.

TABLE 10

| Index | Restriction |
| --- | --- |
| 1 | no restriction |
| 2 | PMI subset |

Modulation Order

The modulation order corresponds to one of QPSK, 16QAM, and 64QAM. QPSK that detects one of four symbols is easily distinguished from 16QAM that detects one of 16 symbols or 64QAM that detects one of 64 symbols. However, blind detection is not easily performed between 16QAM and 64QAM. Hence, when a maximum modulation order of the interference base station is restricted to 16QAM, it is possible to easily distinguish between QPSK and 16QAM available to the interference base station through blind detection.

A table below shows an example of cooperation in (or restriction on) the modulation order.

TABLE 11

| Index | Restriction |
| --- | --- |
| 1 | no restriction |
| 2 | QPSK/16QAM |

Pa

Pa refers to a ratio of power of a PDSCH symbol excluding a CRS to power of a CRS. When restricted to a subset including one to four of eight candidate values (−6 dB, −4.77 dB, −3 dB, −1 dB, 0 dB, 1 dB, 2 dB, and 3 dB) in total, a success rate of blind detection may be enhanced.

A table below shows an example of cooperation in (or restriction on) Pa.

TABLE 12

| Index | Restriction |
| --- | --- |
| 1 | no restriction |
| 2 | 0, 1, 2, 3 dB |

Virtual Cell ID

The virtual cell ID is used to generate a DM-RS sequence in the DM-RS-based TM. A value is to be detected from 504 candidate values and thus a level of difficulty in blind detection needs to be reduced by restricting a subnet to a smaller size.

A table below shows an example of cooperation in (or restriction on) the virtual cell ID.

TABLE 13

| Index | Restriction |
| --- | --- |
| 1 | no restriction |
| 2 | odd number |
| 3 | even number |

When the above-mentioned configuration of cooperation in (or restriction on) each interference parameter needs to include a "no restriction" state that excludes restriction, interference cooperation may be released through a reconfiguration procedure. Unlike the above example, an operation of directly informing the NAICS UE of an interference parameter that may be used in the interference base station may be performed using a scheme such as a bitmap scheme.

Information about the cooperation including a part or all of the above-described information may be provided to the NAICS UE. A signal as below may be considered by collecting the examples of cooperation in (or restriction on) interference parameters.

TABLE 14

| Interference | Interference cell ID | TM | CRS port number | RA type | CFI | Rank | PMI | Modulation order | Pa | vCID |
|---|---|---|---|---|---|---|---|---|---|---|
| index | | 2 | 2 | 2 | 2 | 1 | 1 | 2 | 2 | 2 |

When the above-mentioned signal corresponds to a common cooperation factor between the NAICS UE and an associated interference base station, an ID of the interference base station (the "interference cell ID" in the above Table) may be excluded from the signal. In addition, a cooperation configuration of the interference parameter as in the above Table may be established through RRC or a MAC signal for the NAICS UE.

The MAC signal is transmitted through a PDCCH or a PDSCH. An example of a bit field to be used in this case is given below.

TABLE 15

| Interference | Interference cell ID | TM | CRS port number | RA type | CFI | Rank | PMI | Modulation order | Pa | vCID |
|---|---|---|---|---|---|---|---|---|---|---|
| size | 9 bits | 2 bits | 1 bit | 1 bit | 1 bit | 1 bit | 1 bit | 1 bit | 1 bit | 2 bits |

In the above example, a total length of the MAC signal is 20 bits. Here, the interference cell ID may have a value in a range between 0 and 503 and thus a total of 9 bits are needed, which accounts for a significantly great portion of the length of the MAC signal. Hence, a scheme for excluding the interference cell ID from the MAC signal may be considered.

When the signal is received from the serving base station, the number of bits needed for transmission of the interference cell ID may be reduced by applying an index to neighbor cell information received through RRC signaling and the like and transmitting the index instead of the cell ID. When the signal is received from the interference base station, and if transmission timing of each cell is preset, it is possible to identify the interference base station transmitting an interference signal even when the interference cell ID is excluded from the signal. In this way, when the interference cell ID is excluded from the signal, the total length becomes 11 bits.

The NAICS UE may receive the signal from the serving base station through a backhaul or directly from the interference base station. In either case, the signal is transmitted after being encoded using an RNTI using a cell ID of a base station that transmits the signal. The signal may be periodically transmitted by setting an interval using a scheme such as RRC signaling or the like. In this case, collision between signals may be avoided by setting the same interval and different offsets between base stations.

Figure 6:
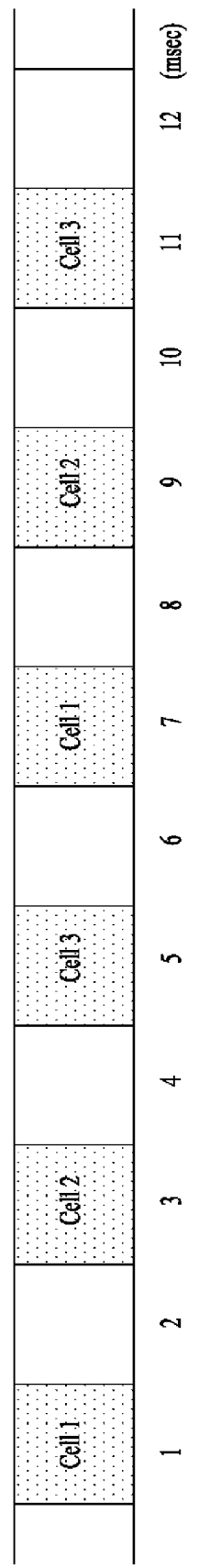
FIG. 6 is a diagram illustrating a transmission timing of a signal related with an interference parameter according to an embodiment of the present invention.

FIG. 6 illustrates transmission timing of the signal according to an embodiment of the present invention. In an example of FIG. 6, the signal has a transmission interval $T_{MAC}$ set to 6 ms, and offsets $T_{off\_MAC}$ ($T_{MAC} > T_{off\_MAC}$) set to 0, 2, and 4 for cell (or base station) 1, cell 2 and cell 3, respectively. Referring to FIG. 6, "cell 1", "cell 2" and "cell 3" refer to signals related to interference parameters transmitted from the cell 1, cell 2 and cell 3, respectively.

In both schemes according to RRC signaling and MAC signaling, dynamic release signaling may be separately operated. In a nonideal backhaul, information transmission between base stations through the backhaul requires time corresponding to several ms to dozens of ms, and information transmission between layers requires time corresponding to dozens of ms. Thus, when the serving base station requests the interference base station for cooperation in or restriction on a certain interference parameter, a time interval between a transmission timing of the request and an actual cooperation application timing at the interference base station may be relatively large. Therefore, RRC signaling or cooperation between base stations in the above-mentioned nonideal backhaul environment may not sufficiently and rapidly reflect change in interference environment between the base stations.

For example, when the interference base station needs to change an interference parameter for a UE served by the interference base station before a subsequent cooperation update timing after cooperation between the base stations, the interference base station needs to sacrifice a transmission rate in the corresponding cell for interference cooperation, or abandon cooperation for NAICS. However, in the nonideal backhaul environment, the time interval is relatively great as described above and thus the change may not be appropriately applied, adversely affecting interference cooperation and data transmission to a serving UE thereof.

The above-mentioned influence increases as a time interval between an interference cooperation request timing and a reflection timing increases. For any reason, when the NAICS UE performs NAICS on the assumption that interference cooperation is applied while the interference base station does not apply interference cooperation, the NAICS UE may not take advantage of NAICS due to a result of blind detection with respect to an incorrect interference parameter. In this regard, auxiliary signaling is needed to rapidly respond to the change of the interference base station.

Figure 7:
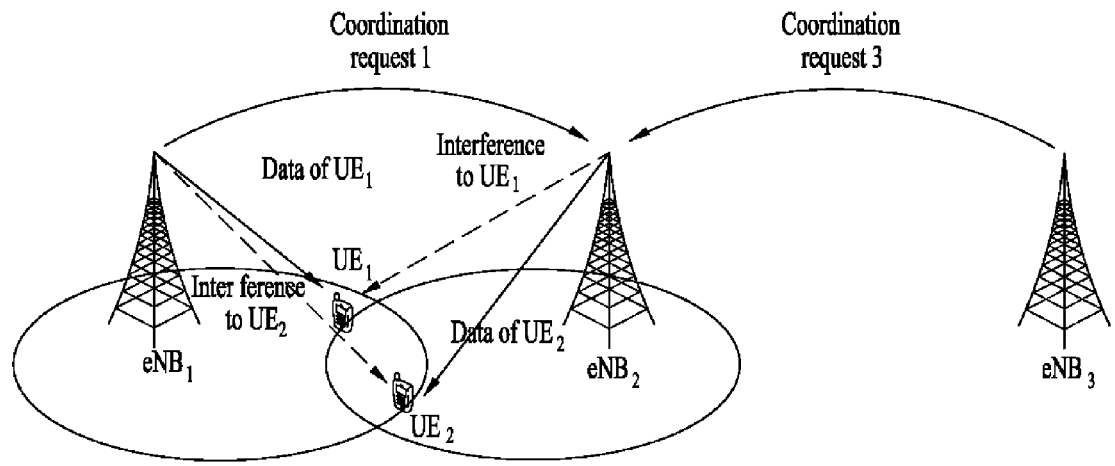
FIG. 7 is a diagram illustrating an example of a circumstance in which a plurality of neighbor base stations transmit interference cooperation requests to a particular base station according to an embodiment of the present invention.

FIG. 7 illustrates an example of a wireless communication system in which a particular eNB requests interference cooperation from a neighbor eNB. It is presumed that when UE1 communicates with eNB1 and cancels interference from eNB2 through NAICS, eNB1 requests, from eNB2, cooperation in an interference parameter through interference cooperation request 1 in order to assist in NAICS of UE1. For a similar reason, it is presumed that eNB3 transmits interference cooperation request 3 to eNB2. For convenience of description, a base station such as eNB2 which actually cooperates in or restricts an interference parameter is referred to as a "restriction base station", and a base station such as eNB1 or eNB3 which is positioned near the restriction base station to request restriction on interference information from the restriction base station is referred to as a "neighbor base station".

Figure 8:
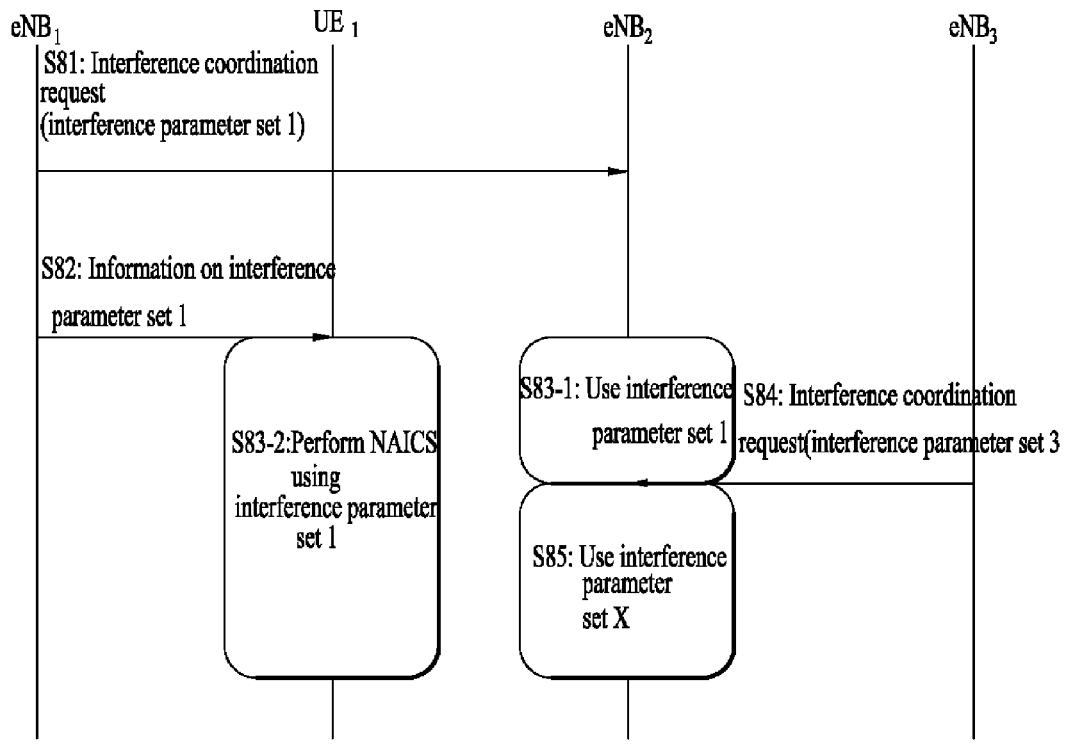
FIG. 8 is a diagram illustrating a procedure of a case in which the plurality of neighbor base stations transmit interference cooperation requests to the particular base station according to an embodiment of the present invention.

In this circumstance, an interference parameter restricted for interference cooperation by the restriction base station may need to be released from restriction. FIG. 8 illustrates a procedure of a case in which a plurality of neighbor eNBs transmit interference cooperation requests to a particular eNB according to an embodiment of the present invention.

In S81, eNB1 transmits an interference cooperation request to eNB2, and the interference cooperation request may include restricted parameter set 1 for interference cooperation. Then, in S82, eNB1 may transmit information about restricted parameter set 1 for interference cooperation to UE1 served by eNB1. Therefore, after a particular point in time, eNB2 may perform an operation related to blind detection thereof using restricted parameter set 1 for interference cooperation in S83-1, and UE1 may perform NAICS using the information about restricted parameter set 1 for interference cooperation in S83-2. Here, although S83-1 and S83-2 may be started at the same point in time or different points in time, FIG. 8 illustrates that S83-1 and S83-2 are started at the same point in time.

In this instance, eNB3 may transmit an interference cooperation request including restricted parameter set 3 for interference cooperation to eNB2 in S84. In this case, in S85, eNB2 needs to determine a restricted parameter set for interference cooperation to be used.

eNB2 may apply restriction having a higher level corresponding to one of restricted parameter sets 1 and 3 for interference cooperation. However, in this case, a transmission rate of eNB2 may be excessively sacrificed due to high restriction applied to eNB2. Thus, eNB2 may select and apply one of restricted parameter sets 1 and 3, and reject the other one. When there are orders of priority between eNBs, and interference cooperation requests of eNB1 and eNB3 coexist, it is possible to accept only an interference cooperation request of an eNB having a higher order of priority to use a parameter set corresponding thereto. In this circumstance, in a case where no other information is provided to UE1 (that is, the NAICS UE), even when an interference parameter from a particular eNB is not restricted any more, UE1 attempts blind detection of the interference parameter on the assumption that the interference parameter is restricted. Thus, performance of NAICS may deteriorate.

Alternatively, the restriction base station (that is, eNB2) may determine a restricted parameter set for interference cooperation to be used by the restriction base station, and then report the restricted parameter set to each neighbor base station. In this circumstance, when the restriction base station applies the parameter set, and then releases the application, a restricted parameter set for new interference cooperation and/or an application point in time thereof need to be reported based on backhaul delay. Otherwise, after a certain period of time from a point in time at which change of information for interference cooperation is needed, the neighbor base stations or the NAICS UE may learn of the change. Thus, a dynamic characteristic of scheduling may not be reflected, which leads to deterioration in NAICS performance.

As described in the foregoing, the interference parameter, which has been restricted for the NAICS UE of the neighbor base station (eNB1) by the restriction base station (eNB2), is not restricted any longer, and the change needs to be reported to the NAICS UE. Therefore, the restriction base station may broadcast information below to the NAICS UE of the neighbor base station through dynamic signaling.

TABLE 16

| Indicator (bit) | Description |
| --- | --- |
| 1 | Release restriction on interference parameter |

When the indicator that indicates release of restriction on the interference parameter is transmitted by the restriction base station using an RNTI using a cell ID thereof, the NAICS UE may decode and identify the release information. The NAICS UE may operate on the assumption that restriction on the interference parameter which has been previously used is not valid any longer from a point in time at which the release information is received. For example, the NAICS UE receiving the indicator that indicates a value of "1" encoded with a cell ID of eNB2 (that is, release of restriction on the interference parameter) may perform NAICS through blind detection having no restriction on an interference signal transmitted from eNB2 according to performance of the NAICS UE, or abandon NAICS.

Alternatively, instead of the indicator that indicates release, the restriction base station (eNB2) may encode the value in a cell ID of the neighbor base station (eNB1) and transmit only a cell ID of the restriction base station to the NAICS UE, thereby informing that interference cooperation of the restriction base station is invalid. The NAICS UE receiving the cell ID of the restriction base station performs NAICS on the assumption that the interference signal from the corresponding base station is no longer valid.

TABLE 17

| Indicator | Description |
| --- | --- |
| Cell ID of eNB2 | Release restriction on interference from eNB2 |

In this case, even though the NAICS UE may perform blind detection using only one cell ID (that is, a cell ID of a serving base station thereof), distribution of orthogonal resources is needed in terms of time/frequency in order to avoid collision of indicator transmissions from different restriction base stations. Here, in order to reduce the number of bits for transmission of the cell ID of the restriction base station, indexing may be performed on the cell ID to separately transmit a corresponding index.

The NAICS UE failing to receive the indicator that indicates release or a cell ID of a particular restriction base station may operate on the assumption that restriction on an interference parameter received from a serving base station thereof (eNB1) is actually applied. For example, the NAICS UE may perform NAICS based on an interference parameter set received from the serving base station thereof. In this case, even though the NAICS UE needs to perform blind detection using all cell IDs of candidates for the restriction base station, it is possible to reduce a need for allocation of orthogonal time/frequency resources for transmission of restricted interference parameters of the restriction base stations.

Figure 9:
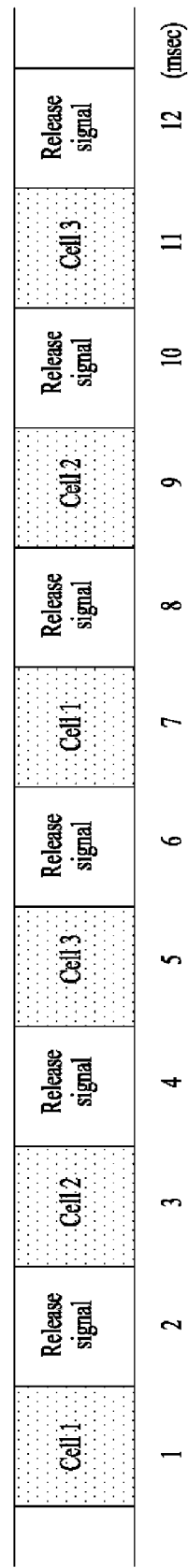
FIG. 9 is a diagram illustrating a transmission timing of a signal related with an interference cooperation release according to an embodiment of the present invention.
Figure 10:
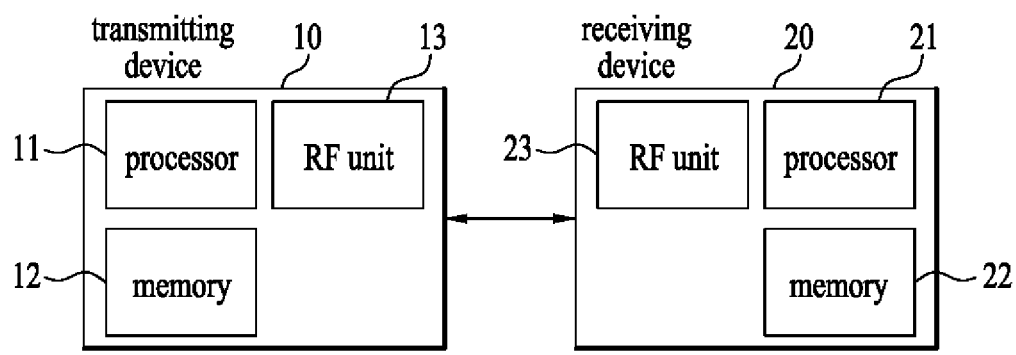
FIG. 10 is a block diagram of a device for implementing an embodiment or embodiments of the present invention.

In addition, signaling for release of interference restriction as described above needs to be configured not to collide with MAC signaling for a restricted interference parameter transmitted by each restriction base station. To this end, a subframe for release signaling is designated when $T_{MAC}$ and $T_{off\_MAC}$ described above are set, and each restriction base station may transmit a release signal in the subframe for release signaling as necessary. FIG. 9 is an example corresponding to a case in which $T_{MAC}$=6, and $T_{off\_MAC}$=0, 2 and 4 (corresponding to respective restriction base stations 1, 2, and 3).

When the restriction base station uses a DMRS-based TM, an nSCID of a DMRS sequence may be used instead of an indicator for release signaling. When an instruction to set or release interference restriction is linked to the nSCID, the instruction to set or release interference restriction may be implicitly delivered to the NAICS UE without the need for separate release signaling. In this case, there is no need to allocate separate resources for release signaling. An example of a linkage between the nSCID and interference restriction configuration or release is shown in the following Table.

TABLE 18

| nSCID | Description |
|---|---|
| 0 | Interference restriction configuration |
| 1 | Interference restriction release |

According to a current 3GPP Rel. 11 standard document, DMRS antenna ports, the number of layers, and allocation of nSCID according thereto are set as in the following Table.

TABLE 19

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID}$ = 0 | 0 | 2 layers, ports 7-8, $n_{SCID}$ = 0 |
| 1 | 1 layer, port 7, $n_{SCID}$ = 1 | 1 | 2 layers, ports 7-8, $n_{SCID}$ = 1 |
| 2 | 1 layer, port 8, $n_{SCID}$ = 0 | 2 | 3 layers, ports 7-9 |
| 3 | 1 layer, port 8, $n_{SCID}$ = 1 | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

Accordingly, when the restriction base station transmits 1 codeword 1 layer or 2 codeword 2 layer using a DMRS, it is possible to perform layer/DMRS antenna port/nSCID allocation based on interference restriction configuration/release.

A method of cancelling interference of a terminal according to an embodiment of the present invention will be described. The method is performed by the terminal. In addition, the method may include receiving interference parameter configuration information including a transmission timing of interference parameter information indicating a restricted set of a plurality of interference parameters to be used by one or more interference base stations associated with the terminal and interference parameter release information including a transmission timing of an indicator indicating release of the interference parameter information, receiving the interference parameter information according to the interference parameter configuration information, performing interference cancellation using the received interference parameter information, attempting detection of the indicator according to the interference parameter release information, and performing interference cancellation without the received interference parameter information or suspending interference cancellation when the indicator is detected. The interference parameter configuration information includes a transmission timing of interference parameter information for respective one of the one or more interference base stations, and the transmission timing of interference parameter information for respective one of the one or more interference base stations may be configured not to collide with each other.

In addition, the interference parameter release information may indicate a transmission start point not colliding with the interference parameter configuration information.

In addition, the interference parameter release information may include a transmission timing of indicators indicating release of interference parameter information for respective one of the one or more interference base stations, and the transmission timing of the indicators indicating release of interference parameter information for respective one of the one or more interference base stations may be configured not to collide with each other.

In addition, the indicator may be encoded with a cell identifier (ID) of a corresponding interference base station or a cell ID of a serving base station of the terminal.

In addition, the indicator may be associated with a scrambling ID value included in downlink control information.

In addition, the interference parameter information may be received from the one or more interference base stations or a serving base station of the terminal.

In addition, the interference parameter information may further indicate an unrestricted set of the plurality of interference parameters.

FIG. 0 is a block diagram of a transmitting device 10 and a receiving device 20 configured to implement exemplary embodiments of the present invention. Referring to FIG. 0, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency downconverts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on uplink and as the receiving device 20 on downlink. In embodiments of the present invention, an eNB serves as the receiving device 20 on uplink and as the transmission device 10 on downlink.

The transmitting device and/or the receiving device may be configured as a combination of one or more embodiments of the present invention.

The present invention may be used for a wireless communication apparatus such as a user equipment (UE), a relay and an eNB.

It is possible to efficiently perform interference cancellation using interference cancellation information according to an embodiment of the present invention, and expect efficient signaling for interference cancellation.

Effects that may be obtained from the present invention are not limited to the above-mentioned effects, and other effects not mentioned may be clearly understood by those skilled in the art from the above description.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

What is claimed is:

1. A method of cancelling interference of a terminal, the method being performed by the terminal, the method comprising:

receiving interference parameter configuration information including a transmission timing of interference parameter information indicating a restricted set of a plurality of interference parameters to be used by one or more interference base stations associated with the terminal and interference parameter release information including a transmission timing of an indicator indicating release of the interference parameter information;

receiving the interference parameter information according to the interference parameter configuration information;

performing interference cancellation using the received interference parameter information;

attempting detection of the indicator according to the interference parameter release information; and performing the interference cancellation without the received interference parameter information or suspending the interference cancellation when the indicator is detected, wherein the interference parameter configuration information includes a transmission timing of interference parameter information for respective one of the one or more interference base stations, and the transmission timing of interference parameter information for respective one of the one or more interference base stations are configured not to collide with each other.

2. The method according to claim 1, wherein the transmission timing of the indicator is configured not to collide with the transmission timing of interference parameter information for respective one of the one or more interference base stations.

3. The method according to claim 1, wherein the interference parameter release information includes a transmission timing of indicators indicating release of interference parameter information for respective one of the one or more interference base stations, and the transmission timing of the indicators indicating release of interference parameter information for respective one of the one or more interference base stations are configured not to collide with each other.

4. The method according to claim 1, wherein the indicator is encoded with a cell identifier (ID) of a corresponding interference base station or a cell ID of a serving base station of the terminal.

5. The method according to claim 1, wherein the indicator is associated with a scrambling ID value included in downlink control information.

6. The method according to claim 1, wherein the interference parameter information is received from the one or more interference base stations or a serving base station of the terminal.

7. The method according to claim 1, wherein the interference parameter information further indicates an unrestricted entire set of the plurality of interference parameters.

8. A terminal configured to perform interference cancellation, comprising:
a radio frequency (RF) unit; and
a processor configured to control the RF unit,
wherein the processor is configured to
receive interference parameter configuration information including a transmission timing of interference parameter information indicating a restricted set of a plurality of interference parameters to be used by one or more interference base stations associated with the terminal and interference parameter release information including a transmission timing of an indicator indicating release of the interference parameter information,
receive the interference parameter information according to the interference parameter configuration information,
perform interference cancellation using the received interference parameter information,
attempt detection of the indicator according to the interference parameter release information, and
perform the interference cancellation without the received interference parameter information or suspend the interference cancellation when the indicator is detected,
wherein the interference parameter configuration information includes a transmission timing of interference parameter information for respective one of the one or more interference base stations, and the transmission timing of interference parameter information for respective one of the one or more interference base stations are configured not to collide with each other.

9. The terminal according to claim 8, wherein the transmission timing of the indicator is configured not to collide with the transmission timing of interference parameter information for respective one of the one or more interference base stations.

10. The terminal according to claim 8, wherein the interference parameter release information includes a transmission timing of indicators indicating release of interference parameter information for respective one of the one or more interference base stations, and the transmission timing of the indicators indicating release of interference parameter information for respective one of the one or more interference base stations are configured not to collide with each other.

11. The terminal according to claim 8, wherein the indicator is encoded with a cell ID of a corresponding interference base station or a cell ID of a serving base station of the terminal.

12. The terminal according to claim 8, wherein the indicator is associated with a scrambling ID value included in downlink control information.

13. The terminal according to claim 8, wherein the interference parameter information is received from the one or more interference base stations or a serving base station of the terminal.

14. The terminal according to claim 8, wherein the interference parameter information further indicates an unrestricted entire set of the plurality of interference parameters.

\* \* \* \* \*